(12) United States Patent
Sugimoto (10) Patent No.: US 7,796,163 B2
(45) Date of Patent: Sep. 14, 2010

(54) SYSTEM FOR AND METHOD OF TAKING IMAGE BASED ON OBJECTIVE BODY IN A TAKEN IMAGE

(75) Inventor: Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 356 days.

(21) Appl. No.: 11/782,792

(22) Filed: Jul. 25, 2007

(65) Prior Publication Data
US 2008/0024644 A1    Jan. 31, 2008

(30) Foreign Application Priority Data
Jul. 25, 2006    (JP) .............................. 2006-202425

(51) Int. Cl.
*H04N 5/225*    (2006.01)
(52) U.S. Cl. .................................. 348/222.1
(58) Field of Classification Search ............. 348/222.1, 348/333.11; 382/118
See application file for complete search history.

(56) References Cited

U.S. PATENT DOCUMENTS

| 6,249,317 | B1 * | 6/2001 | Hashimoto et al. .......... 348/349 |
| 7,415,137 | B2 | 8/2008 | Chen et al. |
| 2003/0071908 | A1 * | 4/2003 | Sannoh et al. .............. 348/350 |
| 2004/0201741 | A1 * | 10/2004 | Ban ........................ 348/231.3 |
| 2004/0208114 | A1 | 10/2004 | Lao et al. |
| 2005/0012830 | A1 * | 1/2005 | Pilu ....................... 348/231.99 |
| 2005/0046724 | A1 | 3/2005 | Kagaya |
| 2005/0084154 | A1 * | 4/2005 | Li et al. .................... 348/231.2 |
| 2007/0153111 | A1 * | 7/2007 | Kato ..................... 348/333.11 |
| 2009/0147107 | A1 * | 6/2009 | Kawahara et al. ........ 348/240.2 |

FOREIGN PATENT DOCUMENTS

| CN | 1508752 A | 6/2004 |
| CN | 1522052 A | 8/2004 |
| JP | 10-136390 A | 5/1998 |
| JP | 2003-143524 A | 5/2003 |

\* cited by examiner

*Primary Examiner*—Jason Whipkey
(74) *Attorney, Agent, or Firm*—Sughrue Mion, PLLC (57) ABSTRACT

In an image taking system such as digital camera, especially when a predetermined objective body such as a face is included, the predetermined objective body is detected from a pre-taken-image or a running image in order to obtain an image reflecting a photographer's intention. Out of image obtaining functions comprising at least one function for setting at least one of image taking conditions in taking the pre-taken-image or the running image, and/or at least one of image taking functions for setting at least one image processing condition to be carried out on the image is set according to the predetermined object body and an image is obtained by the use of only the set image obtaining function.

10 Claims, 9 Drawing Sheets

| DIVISION | MODE | FUNCTION |
|---|---|---|
| FULL AUTO | AUTO | AF, AE, AWB, STROBE, GRADATION CORRECTION |
| MANUAL | P | AF, AWB |
| | A | AF, AWB |
| | S | AF, AWB |
| | M | AF, AWB |
| SCENE | LANDSCAPE | ALL OFF |
| | FLOWER | ALL OFF |
| | EVENING GLOW | AF |
| | HUMAN | AF, AE, AWB, STROBE, GRADATION CORRECTION |

| MODE | FUNCTION | | | | |
|---|---|---|---|---|---|
| | AF | AE | AWB | STROBE | GRADATION CORRECTION |
| AUTO | ON / OFF | ON / OFF | ON / OFF | ON / OFF | ON / OFF |
| P | ON / OFF | ON / OFF | ON / OFF | ON / OFF | ON / OFF |
| A | ON / OFF | ON / OFF | ON / OFF | ON / OFF | ON / OFF |
| S | ON / OFF | ON / OFF | ON / OFF | ON / OFF | ON / OFF |
| M | ON / OFF | ON / OFF | ON / OFF | ON / OFF | ON / OFF |
| LANDSCAPE | ON / OFF | ON / OFF | ON / OFF | ON / OFF | ON / OFF |
| FLOWER | ON / OFF | ON / OFF | ON / OFF | ON / OFF | ON / OFF |
| EVENING GLOW | ON / OFF | ON / OFF | ON / OFF | ON / OFF | ON / OFF |
| HUMAN | ON / OFF | ON / OFF | ON / OFF | ON / OFF | ON / OFF |

SYSTEM FOR AND METHOD OF TAKING IMAGE BASED ON OBJECTIVE BODY IN A TAKEN IMAGE

BACKGROUND OF THE INVENTION

1. Field of the Invention

This invention relates to a method of and a system for taking an image such as a digital camera, and a computer program for causing a computer to execute the method.

2. Description of the Related Art

Recently, in an image-taking by a digital camera, there have been carried out to detect an objective body such as the face from an image obtained by the image-taking and to change the conditions of the image processing to be carried out on the image and/or to change the image-taking conditions during the image-taking according to result of the detection. For example, it has been proposed a technic in which, when an area of a single object is larger than a predetermined value, the white balance is adjusted according to the brightness of the object. (See, Japanese Unexamined Patent Publication No. 10 (1998)-136390) Further, it has been proposed a technic in which whether the strobe light is to be lit is determined on the basis of information on the brightness of the object and the instruction of the photographer on whether the strobe light is to be lit, whereby the information representing result of the determination and the information on the instruction of the photographer are stored together with the image obtained by the image-taking (photographing). (See, Japanese Unexamined Patent Publication No. 2003-143524.) Further, in a digital camera where the photographing mode is variously settable upon photographing and information on the actually set photographing mode is stored with the obtained image attached thereto, it has been proposed a technic in which on an image on which the portrait mode has been set, whether the portrait mode has been set with the photographer's intention is determined and when this question is admitted, the gradation processing is not carried out, while when this question is denied, the gradation processing is carried out. (See, U.S. Patent Application Publication No. 20050046724.)

On the other hand, in the digital camera, when a predetermined objective body such as a face is detected from a through image or a pre-image, the photographing condition upon a running photographing and the image-processing condition upon an image processing are set on the basis of the detected objective body. In this case, in order to set the photographing condition, functions such as an AE processing for setting the exposure, an AF processing for detecting the focusing position, an AWB for automatically adjusting the white balance and a processing to determine whether the strobe light is to be turned on or off are employed. Further, in order to set the image-processing condition, functions such as the gradation processing for correcting the gradation are employed.

In the digital camera, the full-auto mode and the manual mode can be set as the photographing mode. When photographing is carried out with the manual mode set, it is often that the photographer wishes to leave the atmosphere during photographing to the image. Especially, when the photographing is carried out including a predetermined object such as the face, brightness or gradation is sometimes set on the face to represent the photographer's intention. However, if all the afore-said plurality of functions are employed in setting the photographing conditions and the image-processing conditions, an image of the quality intended by the photographer cannot be sometimes obtained. Especially, in the techniques disclosed in Japanese Unexamined Patent Publication Nos. 10(1998)-136390 and 2003-143524, and U.S. Patent Application Publication No. 20050046724, since functions of adjustment of the white balance, emission of the strobe light and the like are automatically used, it is impossible to obtain an image of the quality intended by the photographer.

SUMMARY OF THE INVENTION

In view of the foregoing observations and description, the primary object of the present invention is to obtain an image having quality reflecting the intention of the photographer in an image taking system such as the digital camera.

A first image taking system of the present invention comprises an image taking means which takes an image, an objective body detecting means which detects a predetermined objective body from a pre-taken-image taken by the image taking means, a function setting means which, when the predetermined objective body is detected, sets an image obtaining function used in taking the pre-taken-image or the running image, according to the predetermined objective body out of image obtaining functions comprising at least one function for setting at least one of image taking conditions in taking the pre-taken-image or the running image, and/or at least one of image taking functions for setting at least one image processing condition to be carried out on the image obtained by taking the pre-taken-image or the running image, and a processing control means which obtains the image by the use of the image taking condition and/or the image processing condition based on the set image obtaining function.

A second image taking system of the present invention comprises an image taking means which takes an image, an objective body detecting means which detects a predetermined objective body from a running image taken by the image taking means, a function setting means which, when the predetermined objective body is detected, sets an image obtaining function used in taking the running image, according to the predetermined objective body out of image obtaining functions comprising at least one function for setting at least one of image processing conditions to be applied to the image obtained in taking the running image, and a processing control means which obtains the image by the use of the image processing condition based on the set image obtaining function.

The "pre-taken-image" means an image which is smaller than the running image in the number of pixels and is, for instance, a through image displayed on the monitor before image taking or a pre-image which is obtained to determine image taking conditions and image processing conditions when the shutter release button is semi-depressed not a running image which is recorded on a recording medium such as a memory card when the shutter release button is fully depressed.

The expression to "set an image obtaining function according to the predetermined objective body" means that a function which can cause the predetermined objective body to be of high quality and/or can reflect the photographer's intention upon taking image is set in a plurality of the image obtaining functions.

Further, in the image taking system of the present invention, the function setting means may set the image obtaining functions.

In the image taking system of the present invention, the function setting means may set the image obtaining function which is used according to the scene of the pre-taken-image or the running image.

In the image taking system of the present invention, it is preferred that a changing means for changing the image obtaining function to desired contents be further provided.

In this case, the changing means may be a means which can change the image obtaining function to desired contents in response to receipt of instruction.

In the image taking system of the present invention, a display means which displays the image obtaining function set together with the pre-taken-image or the running image may be further provided.

A first image taking method of the present invention comprises the steps of detecting a predetermined objective body from a pre-taken-image taken by an image taking means which takes an image, setting, when the predetermined objective body is detected, an image obtaining function used in taking the pre-taken-image or the running image according to the predetermined objective body out of image obtaining functions comprising at least one function for setting at least one of image taking conditions in taking the pre-taken-image or the running image, and/or at least one of image taking functions for setting at least one image processing condition to be carried out on the image obtained by taking the pre-taken-image or the running image, and obtaining the image by the use of the image taking condition and/or the image processing condition based on the set image obtaining function.

A second image taking method of the present invention comprises the steps of detecting a predetermined objective body from a running image taken by an image taking means which takes an image, when the predetermined objective body is detected, setting an image obtaining function used in taking the running image, according to the predetermined objective body out of image obtaining functions comprising at least one function for setting at least one of image processing conditions to be applied to the image obtained in taking the running image, and obtaining the image by the use of the image processing condition based on the set image obtaining function.

Further, a computer program for causing a computer to execute the first or second image taking method of the present invention may be provided. The computer program may be recorded on a computer-readable medium. A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In accordance with the present invention, when a predetermined objective body is detected from a pre-taken-image, an image obtaining function used in taking the pre-taken-image or the running image is set according to the predetermined objective body out of a plurality of functions comprising at least one function for setting image taking conditions in taking an image and/or at least one functions for setting at least one image processing conditions to be carried out on the image taken by taking a pre-taken-image or a running image. Then a running image is obtained by taking a running image by the use of the image taking condition and/or the image processing condition based on the set image obtaining function. Accordingly, when a predetermined objective body is detected, a pre-taken-image or a running image is obtained under an image taking condition and/or the image processing condition according to the predetermined objective body. As a result, a pre-taken-image or a running image having an image quality according to the predetermined objective body can be obtained.

By setting the image obtaining function according to the image taking mode, a running image can be obtained in an image taking condition and/or an image processing condition reflecting the photographer's intention, especially when the photographer took the image so that the object body reflected his or her own intention. Accordingly, a running image having image quality according to the photographer's intention can be obtained.

Further, by setting the image obtaining function according to the scene of the pre-taken-image or the running image, a running image can be obtained in an image taking condition and/or an image processing condition reflecting the photographer's intention, especially when the photographer took the image so that the feature of the scene is reflected.

When the image obtaining function is variable in its contents, a running image having image quality according to the photographer's intention can be surely obtained since the image taking condition and the image processing condition to be used in taking a running image can be set to conform to the photographer's intention.

By displaying the set image obtaining function when an image to be taken or a running image is displayed by the display means, the photographer can be informed of the set image obtaining function.

DESCRIPTION OF THE PREFERRED EMBODIMENT

Figure 1:
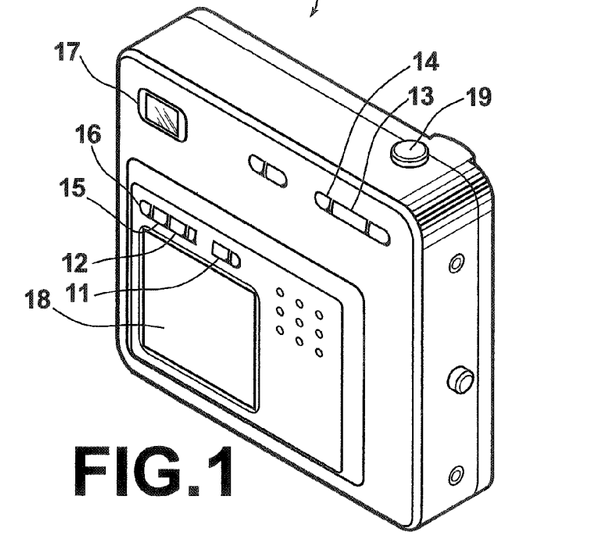
FIG. 1 is a perspective view showing a digital camera in accordance with a first embodiment of the present invention as viewed from rear.
Figure 2:
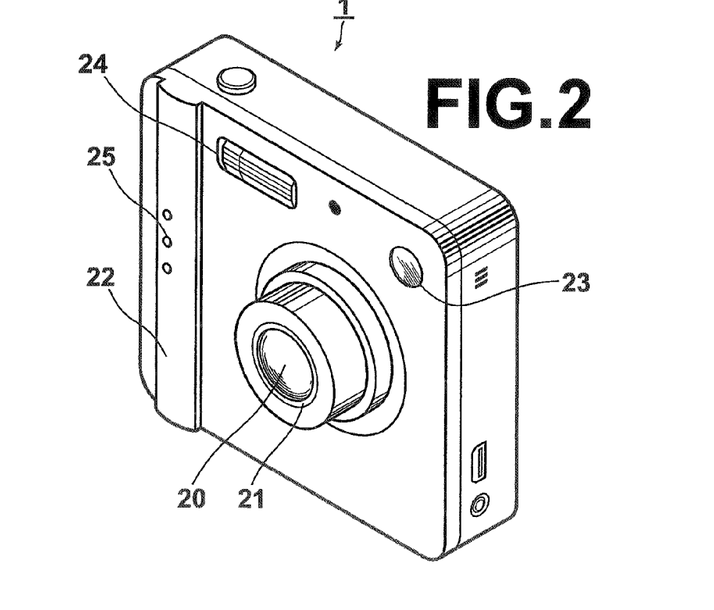
FIG. 2 is a perspective view showing the digital camera of the first embodiment as viewed from front.

Embodiments of the present invention will be described with reference to the drawings, hereinbelow. FIG. 1 is a perspective view showing a digital camera in accordance with a first embodiment of the present invention as viewed from rear. As shown in FIG. 1, as an interface for control by the photographer, an action mode switch 11, a menu/OK button (input means) 12, a zoom/up and down arrow lever 13, a right and left arrow button 14, a back (return) button 15 and a display switching button 16 are provided on the rear surface of the body of the digital camera 1. The rear surface of the body of the digital camera 1 is further provided with a finder 17 for image taking and a liquid crystal monitor 18 and the upper surface of the camera body is provided with a shutter release button 19. Further, as shown in FIG. 2, a taking lens 20, a lens cover 21, a power switch 22, the finder window 23, a strobe light 24 and a self-timer lamp 25 are provided on the front surface of the camera body 10.

The action mode switch 11 is a slide switch for switching the action modes between a still image taking mode, an animation taking mode and a reproduction mode.

The menu/OK button 12 is a button for displaying on the monitor 18 various menus for setting the kind of the image taking mode, a strobe lighting mode, recording pixel number or sensitivities in response to depression thereof, and for selection/setting on the basis of the menu displayed on the monitor 18. Further, by the menu/OK button 12, it is possible to set the image taking mode to a full auto-mode where the exposure and the white balance are all automatically set or a manual mode where the exposure and the white balance are all manually set. As the manual mode, a program auto-mode, an aperture priority mode, a shutter priority mode, and a manual exposure mode can be set. Further, by the menu/OK button 12, it is possible to set as the manual mode an image taking mode where the image taking is carried out according to the kind of scene, that is, the landscape, the flower, the evening glow, or the human.

When the zoom/up and down arrow lever 13 is inclined up and down, tele/wide of the camera 1 is adjusted when an image is to be taken and the cursor displayed in the menu screen displayed on the monitor 18 is moved up and down when various values are set.

The right and left arrow button 14 is a button for moving right and left the cursor in the menu screen displayed on the monitor 18 when various values are set.

When the back (return) button 15 is depressed, setting of the various values is interrupted, and the preceding screen is displayed on the monitor 18.

The display switching button 16 is a button for switching ON and OFF of the display on the monitor 18, various guidance messages, ON and OFF of the character display when depressed.

The contents set by the control of the button or the lever can be recognized through the display on the monitor 18, the lamp in the finder, the position of the slide lever or the like. Further, the monitor 18 displays a through image for confirming the object when taking an image. With this arrangement, the monitor 18 displays a still image and an animation after photographing and various values set in the menus as well as functions as an electronic viewfinder.

Figure 3:
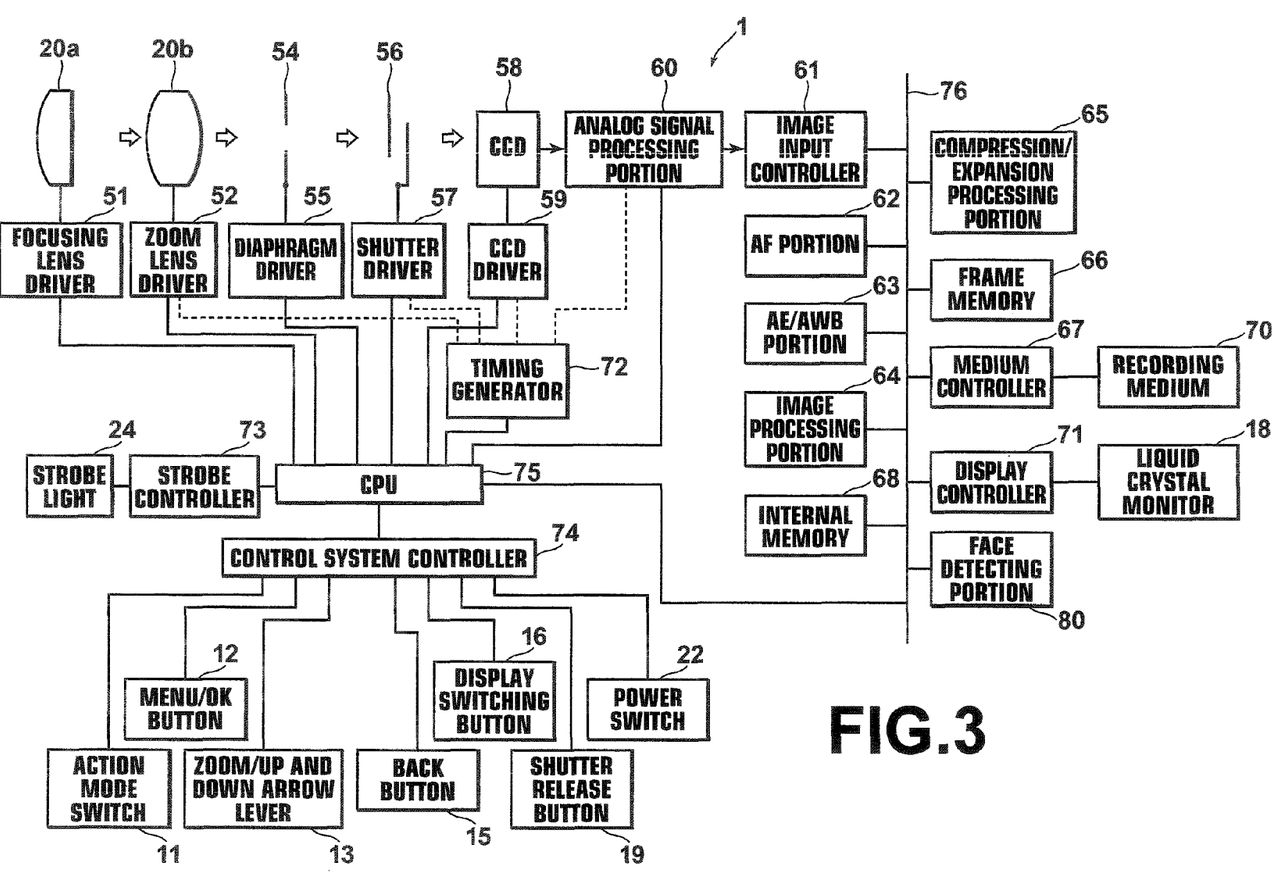
FIG. 3 is a block diagram showing functions of the digital camera of the first embodiment.

FIG. 3 is a block diagram showing functions of the digital camera 1 in accordance with an embodiment of the present invention. The digital camera 1 shown in FIG. 3 converts image data obtained by the inage taking to an image file in the Exif format and records it on an external recording medium 70 detachable from the camera body.

As the control system of the digital camera 1, there are provided the action mode switch 11, menu/OK button 12, zoom/up and down arrow lever 13, right and left arrow button 14, back (return) button 15, display switching button 16, shutter release button 19, power switch 22 and a control system control portion 74 which is an interface for transferring the contents of control of the elements described above to a CPU 75.

As an optical system, a focusing lens 20a and a zoom lens 20b are provided. The lenses 20a and 20b are stepwise driven respectively by a focusing lens driver 51 and a zoom lens driver 52 comprising an electric motor and a motor driver to be moved in the direction of the optical axis. The focusing lens driver 51 stepwise drives the focusing lens 20a on the basis of focus driving amount data output from an AF portion 62. The zoom lens driver 51 stepwise drives the zoom lens 20b on the basis of data on the amount of control of the zoom/up and down lever 13.

A diaphragm 54 is driven by a diaphragm driver 55 comprising an electric motor and a motor driver. The diaphragm driver 55 adjusts the diameter of opening of the diaphragm 54 on the basis of diaphragm data output from an AE/AWB portion 63.

Shutter 56 is a mechanical shutter and is driven by a shutter driver 57 comprising an electric motor and a motor driver. The shutter driver 57 controls open/closure of the shutter 56 on the basis of a signal generated in response to depression of the shutter release button 19 and shutter speed data output from the AE/AWB portion 63.

Behind the optical system described above, a CCD 58 which is an image-taking element is provided. The CCD 58 has a photoelectric surface comprising a lot of two-dimensionally arranged light receiving elements, and an image of the object passing through the optical system is imaged on the photoelectric surface to be photoelectrically converted. Forward of the photoelectric surface, there are disposed a micro-lens array for collecting light on each of the pixels and a color-filter array comprising a lot of red filters, green filters and blue filters which are regularly arranged. The CCD 58 outputs electric charges accumulated by the pixels line by line as serial analog image-taking signals in synchronization with vertical and horizontal clock signals supplied from a CCD control portion 59. The electric charge accumulating time of each pixel, that is, the exposure time, is determined by an electronic shutter-drive signal given by the CCD control portion 59. The CCD 58 has been adjusted in its gain by the CCD control portion 59 so that an analog image-taking signals of a predetermined amplitude can be obtained.

The analog image-taking signals taken in from the CCD 58 is input into an analog signal processing portion 60. The analog signal processing portion 60 comprises a correlation double sampling circuit (CDS) for removing noise of the image signal, an auto-gain controller (AGC) for adjusting the gain of the analog signal and an A/D converter (ADC) for converting the analog signal to a digital image data. The digital image data is a CCD-RAW data having R, G, B density values by each of the pixels.

A timing generator 72 generates timing signals, and the timing signals are input into the shutter driver 57, the CCD control portion 59 and the analog signal processing portion 60 to synchronize operation of the shutter button 19, open and closure of the shutter 56, taking in of the electric charge of the CCD 58 and processing by the analog signal processing portion 60.

A strobe control portion 73 causes the strobe light 24 to emit light upon image taking. Specifically, so long as the strobe light emission mode is on and the strobe light emission mode is the auto mode, strobe light 24 is turned on to light the strobe light 24 upon image taking when the brightness of the pre-image (to be described later) is lower than the predetermined brightness. On the other hand, when the strobe light emission mode is off, the strobe light 24 is inhibited from being lit upon image taking.

The function of the strobe control portion 73 to turn on and off the strobe light governs whether the strobe light is to be used in taking a running image according to whether a face has been detected (to be described later) and the kind of the image taking mode.

An image input controller 61 writes, in a frame memory 66, the CCD-PAW data input from the analog signal processing portion 60.

The frame memory 66 is a working memory for use when each of various digital image processing (signal processing) to be described later is to be carried out on the image data, and may comprise an SDRAM (synchronous dynamic random access memory) which transfers data in synchronization with bus clock signals of a constant period.

A display control portion 71 is for displaying on the monitor 18, image data stored in the frame memory 66 as a through image, and for displaying on the monitor 18, image data stored in the external recording medium 70 when the reproduction mode has been set. The through image is taken at predetermined time intervals by the CCD 58 during selection of the image taking mode.

The AF portion 62 and the AE/AWB portion 63 determines the image-taking conditions on the basis of the pre-image. The pre-image is represented by image data stored in the frame memory 66 as a result from the CPU 75 causing the CCD 58 to execute pre-image taking upon detection of a semi-depression signal generated in response to semi-depression of the shutter release button 19.

The AF portion 62 detects the focusing position on the basis of the pre-image and outputs focusing-lens drive amount data (AF processing). As the system for detecting the focusing point, a passive system where the focusing point is detected on the basis of a feature that the contrast of an image in focus increases.

The AE/AWB portion 63 measures the brightness of the object on the basis of the pre-image and determines diaphragm value and shutter speed on the basis of the measured brightness of the object, thereby determining the diaphragm value data and shutter speed data as the set value of exposure (AE processing) while automatically adjusts white balance (AWB processing) upon image-taking When the image-taking is in the manual mode, the operator of the digital camera 1 can manually set the exposure and the white balance. Even when the exposure and the white balance are automatically set, they can be manually adjusted by operator's instruction through the control system such as the menu/ok button 12.

Whether the AF processing function of the AF portion 62, and the AE function and the AWB processing function of the AE/AWB portion 63 are used in the running image-taking is set according to whether a face is detected and according to the kind of the image taking mode.

An image processing portion 64 carries out image quality corrections on the image data of the running image such as a gradation-correction, a sharpness correction and a color correction, and carries out YC processing where the CCD-RAW data is converted to YC data comprising Y data which is a brightness signal, Cb data which is a blue difference signal and Cr data which is a red difference signal. This "running image" is an image based on image data which is stored in the frame memory 68 by way of the analog signal processing portion 60 and the image input controller 61 after an image signal is output from the CCD 58 in taking the running image to be executed in response to full-depression of the shutter release button 19. Though the upper limit of the number of pixels of the "running image" is governed by the number of pixels of the CCD 58, the number of pixels used in the recording can be changed, for instance, by the user's setting an image quality (fine, normal and the like). On the other hand, the number of pixels of the through image and/or a pre-image maybe smaller than that of the running image, for instance, about 1/16 thereof.

Whether the gradation processing function of the image processing portion 64 is used in the running image-taking is set according to whether a face is detected and according to the kind of the image taking mode as will be described later.

A compression/expansion processing portion 65 compresses, for instance, in JPEG format, image data which has been processed with a correction and the conversion by the image processing portion 64 and generates an image file. To this image file, a tag in which information such as photographing date is stored on the basis of the JPEG format or the like is attached. This compression/expansion processing portion 65, in a reproduction mode, reads out the compressed image file from the external recording medium 70 and expands it. Expanded image data is output to the monitor 18.

The medium control portion 67 accesses the external recording medium 70 to control read and write of the image file.

An internal memory 68 stores various constants set in the digital camera 1 and a program to be executed by the CPU 75.

The face detecting portion 80 detects the face of a human from the through image. Specifically, the face detecting portion 80 detects as a face area the area having features of the face included in the face (for instance, has a skin color, has eyes, or has a contour of the face, or the like).

For example, technic disclosed in Japanese Unexamined Patent Publication No. 2006-202276 can be employed. The technic disclosed in Japanese Unexamined Patent Publication No. 2006-202276 is conceivable that the face pursuit is based on a machine learning technic employing Adaboost where a known technic such as movement vectors, detection of a feature point or the like and learning data are updated time to time by weighting them upon re-sampling and the obtained machines are finally added up with the weight for the learning machines to make integrated learning machines. It is a technic, for instance, for detecting positions of points representing landmarks from image of faces by the use of distinguishers obtained by carrying out learning on brightness profiles of points of a plurality of sample images which are known as predetermined·landmarks and which are known as not a predetermined-landmark by a machine learning technic upon construction of a frame model by fitting an averaged frame model in the actual face image and changing the averaged frame model so that the position of each landmark on the averaged frame model conforms to the position of the correspondent landmark detected from the face and distinguishing conditions for each of the distinguishers. It is possible to employ the technic of Japanese Unexamined Patent Publication No. 2004-334836. The technic of Japanese Unexamined Patent Publication No. 2004-334836 is a technic for detecting whether there is an image of a featured part in image data to be processed by cutting out image data of a predetermined size from the image data and comparing the image data cut out with the reference data of the featured part. As the technic disclosed in Japanese Unexamined Patent Publication No.

2007-11970, a face of animal and the like may be detected as the particular object instead of a face of human. In this particular embodiment, the face may be detected from a pre-image.

A CPU 75 controls each element of the digital camera 1 according to signals from the various processing portions such as the control systems (action mode switch 11) and the AF portion 62. Further, the CPU 75 sets which of the AF processing function, AE processing function, AWB processing function, strobe light on/off function and the gradation processing function is to be used as the image taking condition or the image processing condition upon the running image taking according to whether a face is detected and the kind of the image taking mode, and instructs the AF portion 62, the AE/AWB portion 63, image processing portion 64 and the strobe control portion 73 on the fact.

A data bus 76 is connected to the image input controller 61, each of the processing portions 62 to 65, the frame memory 66, the medium control portions 67, the internal memory 68, the display control portion 71, the face detecting portion 80 and the CPU 75, and each of the pieces of data is transmitted and received by way of the data bus 76.

An operation of the digital camera 1 will be described in brief with reference to the flowchart shown in FIG. 4, hereinbelow.

The CPU 75 first determines the working mode of the digital camera 1. (step ST1) When it is determined that the working mode is the reproduction mode, the reproduction is carried out, where the image data which has been stored in the external recording medium 70 is read out and an image is displayed on the monitor 18 on the basis of the image data. (step ST2) Then the processing is ended.

On the other hand, when it is determined in step S1 that the working mode is the image-taking mode, the CPU 75 controls to take the through-image (step ST3). Then the face detecting portion 80 detects a face from the through image (step ST4) and whether the shutter release button 19 has been semi-depressed is determined. (step ST5) When step ST5 is denied, the CPU 75 returns to step ST3 and repeats the processing of step ST3 and the following step.

When step ST5 is affirmed, the CPU 75 takes a pre-image to obtain the pre-image and obtains result of detection of a face from the through image (step ST6). Then the CPU 75 determines whether the face has been detected on the basis of the result of detection. (step ST7) When step ST7 is affirmed, the CPU 75 determines the kind of the image-taking mode currently set (step ST8) and sets which of the AF processing function, AE processing function, AWB processing function, strobe light on/off function and the gradation processing function is to be used as the image taking condition or the image processing condition upon the running image taking according to the kind of the set image-taking mode. Then the CPU 75 instructs the AF portion 62, the AE/AWB portion 63, image processing portion 64 and the strobe control portion 73 on the fact. (function setting according to the image-taking mode; step ST9) And the AF portion 62, the AE/AWB portion 63, image processing portion 64 and the strobe control portion 73 set the AF processing, AE processing, AWB processing, on/off of the strobe light and/or the gradation processing. (setting for detecting a face; step ST10) This function will be described in detail, hereinbelow.

Figure 5:
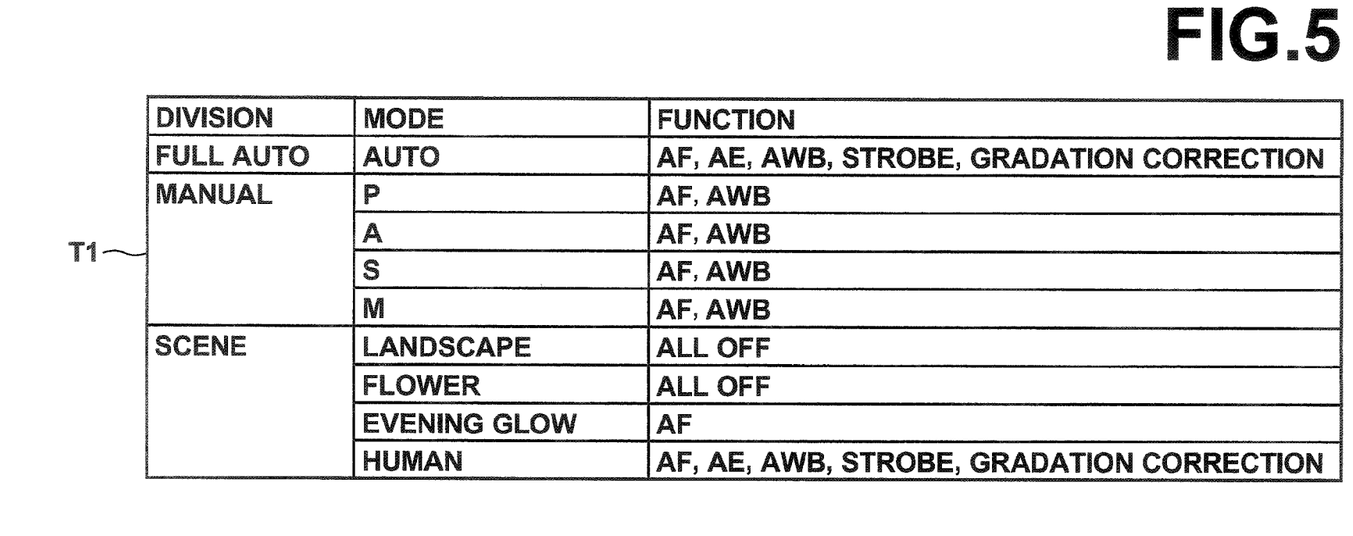
FIG. 5 is a view showing a table which represents the relation between the kind of the image taking mode and the functions to be used.

FIG. 5 shows the relation between the kind of the image taking mode and the function to be used. As shown in FIG. 5, in this table T1, the image taking mode is divided into three kinds, full-auto series, manual series, and scene series. The image taking mode of the full-auto series is AUTO (full-auto mode) and information to use all the AF processing function, AE processing function, AWB processing function, the strobe light on/off function and the gradation processing function is linked to the full-auto mode.

The manual series image taking mode is P (program-auto mode), A (aperture priority mode), S (shutter priority mode) or M (manual exposure mode) and information to use only the AF processing function, and the AWB processing function is linked to the manual series image taking mode.

The scene series image taking mode is landscape mode, flower mode, evening glow mode, or human mode and information to use none of the AF processing function, AE processing function, AWB processing function, the strobe light on/off function and the gradation processing function is linked to the landscape mode and the flower mode (all off). On the other hand, information to use only the AF processing function is linked to the evening glow mode, and information to use all the AF processing function, AE processing function, AWB processing function, the strobe light on/off function and the gradation processing function is linked to the human mode.

Accordingly, the CPU 75 obtains information on which of the AF processing function, AE processing function, AWB processing function, the strobe light on/off function and the gradation processing function is to be used by referring to the table 1 on the basis of the currently set image taking mode, and instructs the AF portion 62, the AE/AWB portion 63, image processing portion 64 and the strobe control portion 73 on the basis of the information.

Figure 6:
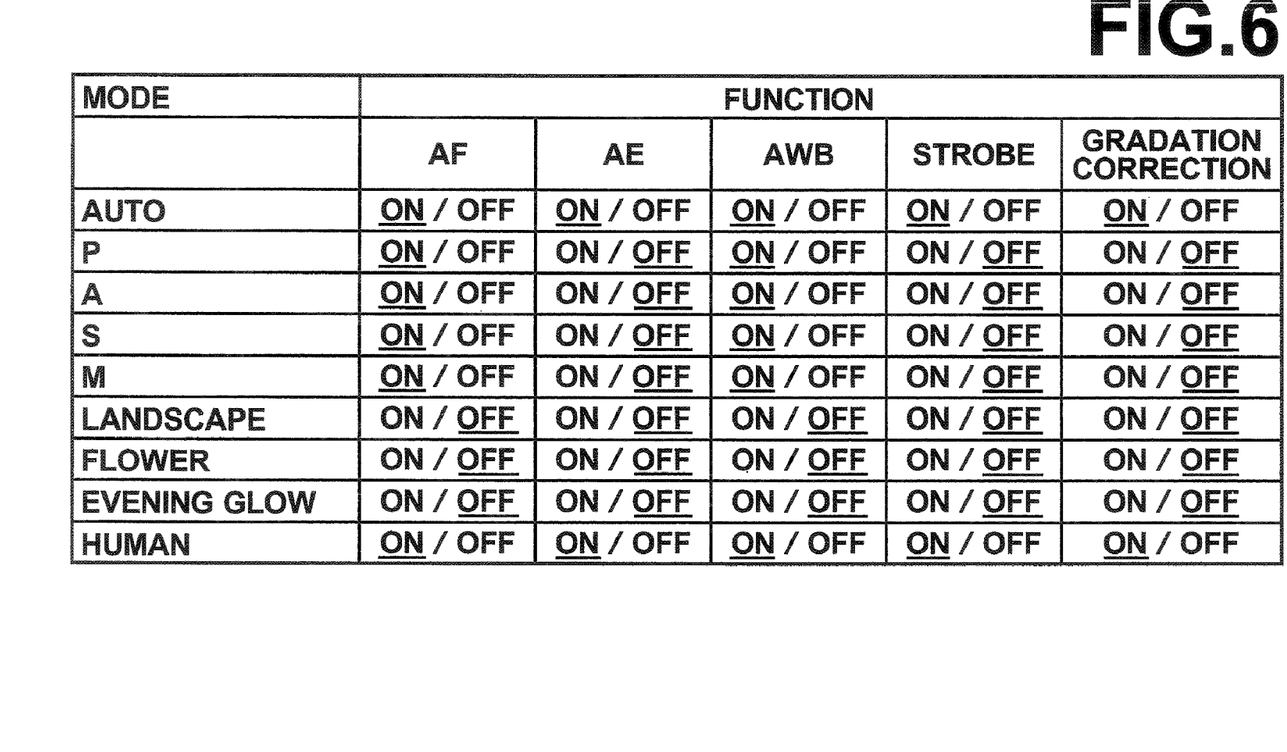
FIG. 6 is a view showing a function setting screen in the first embodiment.

Though the table 1 has been prepared in advance and stored in the internal memory 68, the table T1 may be settable as desired by the photographer. For example, a function setting screen such as shown in FIG. 6 may be displayed on the monitor 18 so that on and off setting of the AF processing function, AE processing function, AWB processing function, the strobe light on/off function and the gradation processing function can be switched in each mode. Such modes need not be all tabulated, but on/off of the functions of each mode may be discretely switched. Further, the personal computer and the digital camera 1 may be connected so that setting of on/off of each function can be carried out in the personal computer and result of the setting is transmitted from the personal computer to the digital camera 1, and the table T1 may be updated according to the transmitted result of the setting.

By making the functions to be used changeable as desired by the photographer, the image taking condition and/or image processing condition to be used in the running image-taking may be set as desired by the photographer, whereby a running image having a quality according to the photographer's intention can be surely obtained.

When step ST7 is denied, the CPU 75 instructs the AF portion 62, the AE/AWB portion 63, image processing portion 64 and the strobe control portion 73 to execute the normal AF processing, AE processing, AWB processing, on/off of the strobe light and gradation processing according to the image-taking mode. (normal function setting; step ST11) Then, the AF portion 62, the AE/AWB portion 63, image processing portion 64 and the strobe control portion 73 set the AF processing, AE processing, AWB processing, on/off of the strobe light and gradation processing as instructed by the CPU 75. (normal setting; step ST12).

Figure 7:
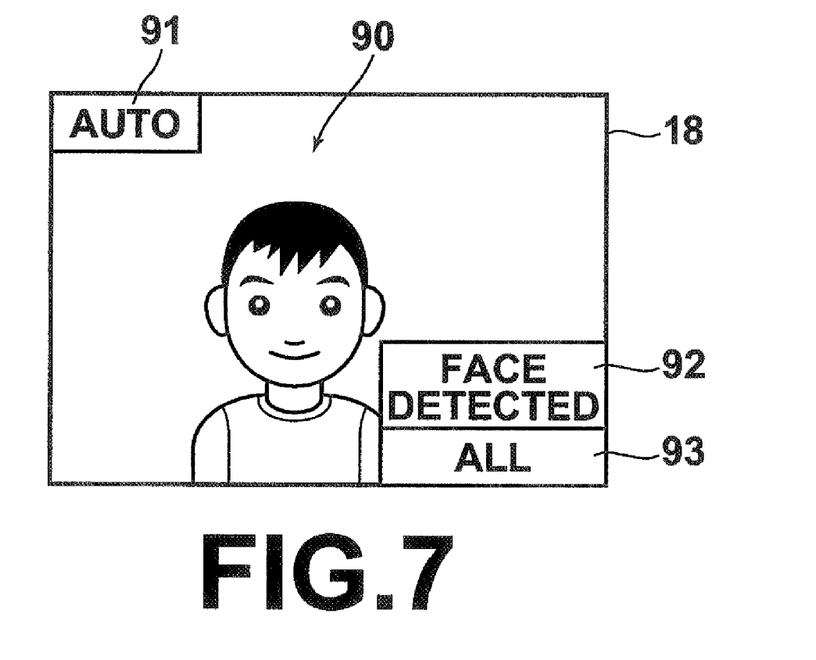
FIG. 7 is a view showing a state where the kind of the image taking mode, information representing that the face has been detected and the set function are displayed on the liquid crystal monitor together with the pre-image.

When a face is detected, it is preferred that information on the kind of the image-taking mode, information representing that a face has been detected and the set function be displayed on the monitor 18 together with the pre-image. FIG. 7 shows a state where the information on the kind of the image-taking mode and the information representing that a face has been detected and the set function is displayed on the monitor 18 together with the pre-image. As shown in FIG. 7, the pre-image 90, the information 91 on the kind of the image-taking mode ("AUTO" in this particular example), the information 92 representing whether a face has been detected("FACE DETECTED" (representing that a face has been detected) in this particular example), and the information 93 on the set function ("ALL" in this particular example)are displayed on the monitor 18. With this display, the photographer can know information on the kind of the image-taking mode, information representing that a face has been detected and the set function.

Following step ST10 or ST12, the CPU 75 determines whether the semi-depression of the shutter release button 19 has been released. (step ST13) When it is determined that the semi-depression of the shutter release button 19 has been released, the CPU 75 proceeds to step ST3 and repeats the steps from step ST3. When it is determined that the semi-depression of the shutter release button 19 has not been released, the CPU 75 determines whether the shutter release button 19 has been fully depressed. (step ST14) When it is determined that the shutter release button 19 has not been fully depressed, the CPU 75 returns to step ST13. When it is determined that the shutter release button 19 has been fully depressed, the CPU 75 executes a running image taking (step ST15), and carries out the image processing on the running image obtained by the running image taking (step ST16).

In this case, it is preferred that, when a face is included in the running image, the face be detected in the running image, and the image processing be carried out so that the detected face has desired image quality.

Then the CPU 75 displays the processed running image on the liquid crystal monitor 18 and at the same time, records the same on the external recording medium 70. (step ST17) Then, the CPU 75 determines whether the power switch 22 is turned off (step ST18) and, when step ST18 is denied, the CPU 75 returns to step ST1 and repeats the processing in step ST1 and the following steps. When step ST18 is affirmed, processing is ended.

Thus in accordance with this embodiment, which of the AF processing function, AE processing function, AWB processing function, the strobe light on/off function and gradation processing function is to be used upon running image-taking is set according to the image-taking mode when a face is detected in the through image and the running image is obtained according to the set functions. Accordingly, when a face is detected, a running image is obtained under the image-taking condition and/or the image processing condition according to the face, whereby a running image having image quality according to the face can be obtained.

By setting the image obtaining function according to the image taking mode, a running image can be obtained in an image taking condition and/or an image processing condition reflecting the photographer's intention, especially when the photographer took the image so that the object body reflected his or her own intention. Accordingly, a running image having image quality according to the photographer's intention can be obtained.

In the embodiment described above, information representing the functions used upon running image-taking may be recorded on the external recording medium 70 attached to the running image together with the information on image-taking mode when a face is detected. Specifically, information representing the functions used upon running image-taking may be attached to the running image by writing the functions used in the tag of the running image.

When the running image attached with the information representing functions is displayed on the monitor 18, it pre-ferred that, similarly to the case shown in FIG. 7, the information on the kind of the image-taking mode and the information representing that a face has been detected and the set function be displayed on the monitor 18 together with the running image.

Further, in the embodiment described above, as shown in FIG. 8, the digital camera 1 may be provided with a scene analysis portion 82 which analyzes a scene to be taken on the basis of the through image or the pre-image so that which of the AF processing function, AE processing function, AWB processing function, the strobe light on/off function and gradation processing function is employed is set according to the scene to be taken. In this case, the functions to be used may be set by referring to the table T1 on the basis of result of the scene analysis.

Figure 8:
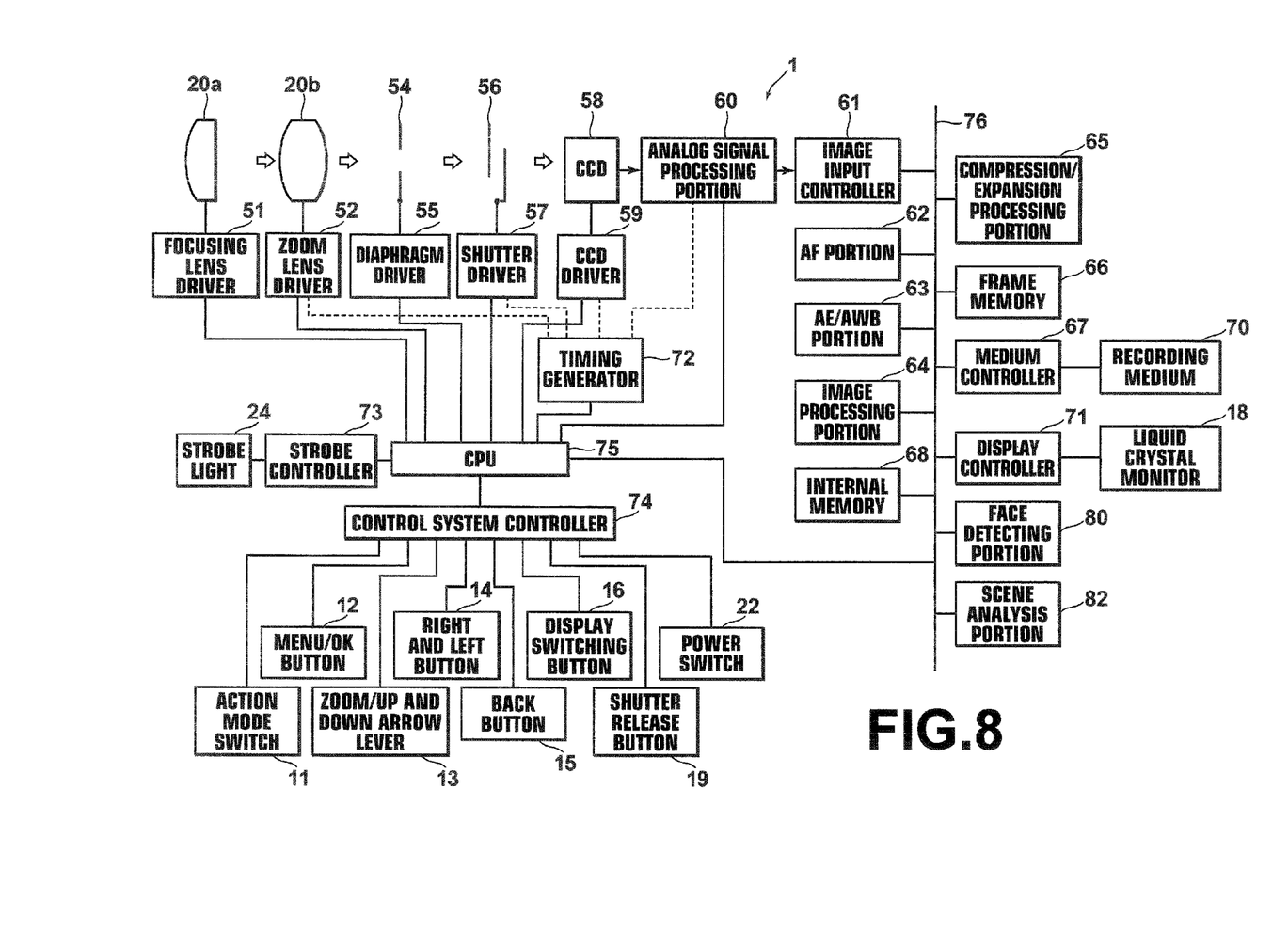
FIG. 8 is a block diagram briefly showing a digital camera in accordance with another embodiment of the present invention.

As an example of the technic for the scene analysis in the scene analysis portion 82, the technic disclosed, for instance, in Japanese Unexamined Patent Publication No. 2005-310123, can be employed. In the technic disclosed in Japanese Unexamined Patent Publication No. 2005-310123, since a plurality of distinguishers selecting various particular scenes are employed in selecting a particular scene taking into account the tendency where the position of a featured part corresponding to a desired particular scene is in the image of the object and even the fluctuation in the position or the area proportion thereof due to the difference in the manner determining the frame and selection of a particular scene is represented by the threshold value of a particular distinguisher or a sum of a plurality of threshold values. Further, the technic disclosed in Japanese Unexamined Patent Publication No. 2005-122720 can be employed. In the technic disclosed in Japanese Unexamined Patent Publication No. 2005-122720, reference data defining the kind of feature value and distinguishing conditions for use in distinguishing a plurality of scenes which can be designated as particular scenes is stored in a memory by a plurality of scenes. All the feature values for use in distinguishing a plurality of scenes which can be designated as particular scenes are extracted from the image data to be selected. Distinguishing conditions in the reference data are referenced to on the basis of the extracted feature values. Whether the image data to be distinguished can be known, for instance, by whether the extracted feature values are predetermined threshold values.

The scene analysis portion 82 has been sometimes set to execute the scene analysis and a scene photographing mode has been sometimes set.

Figure 10A:
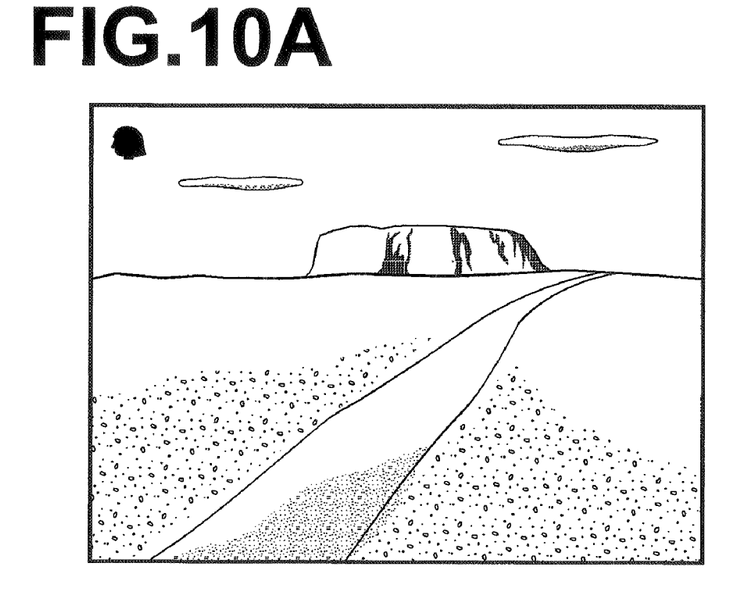
FIGS. 10A and 10B are views showing the liquid crystal monitor when the image taking mode and the scene analysis are both set.

For example, though the photographing mode is the human mode, there is sometimes no object (human) in the through image or the pre-image as in FIG. 10A, which is one of the evening glow scene. In this case, it is conceivable that the value of the threshold value of the scene analysis as the evening glow scene is high (the value of the threshold value of the scene analysis as the human is low). Even if the photographing mode has been set, when the scene analysis portion 82 obtains a result (strong in likelihood) that the scene is a particular scene that is, that the predetermined threshold value, which is the reference to determine whether the scene is a particular scene, is not smaller than a certain value, the priority may be put on a result of the scene analysis by the scene analysis portion 82 rather than the setting by the photographing mode in setting the photographing condition or the image processing condition. Further, the photographing condition or the image processing condition may be set only on the basis of the scene analysis result. There are sometimes objects (human) (F1 to F4 represents a face detecting frame) in the through image or the pre-image as in FIG. 10B, which is one of the evening glow scene, with the photographing mode set as the human mode. In this case, the scene analysis portion 82 recognizes (analyzes) that the scene is an evening glow scene through the scene analysis and that the scene is a human scene on the other hand.

Figure 10B:
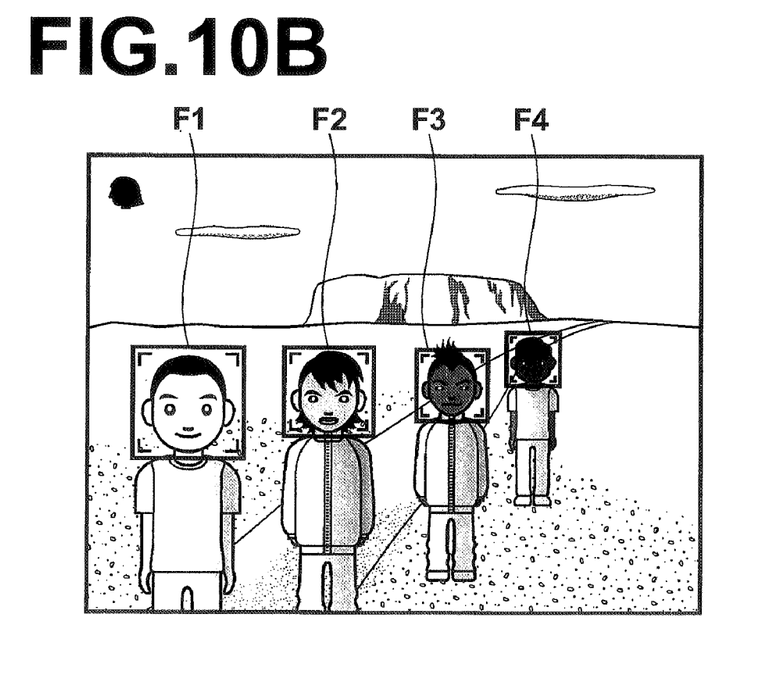

Though, the scene analysis portion 82 analyzes that the scene is an evening glow scene and a human scene, there is sometimes a case where the confidence that the scene results in an evening glow scene and a human scene (or a particular scene) is lower than a threshold value. In such a case, the priority may be put on the setting by the photographing mode rather than a result of the scene analysis by the scene analysis portion 82 in setting the photographing condition or the image processing condition.

Further, the photographing condition and the image processing condition my be set only on the basis of the photographing mode. In this case, the calculation of the scene analysis by the scene analysis portion 82 may be interrupted.

Though being a face in the embodiment described above, the predetermined objective body need not be limited to the face but may be an object other than the face.

Further, though being used upon the running image taking in the embodiment described above, each of the set functions may be used when a through image is further taken. Each of the set functions may be used also when a pre-image is taken.

Figure 9:
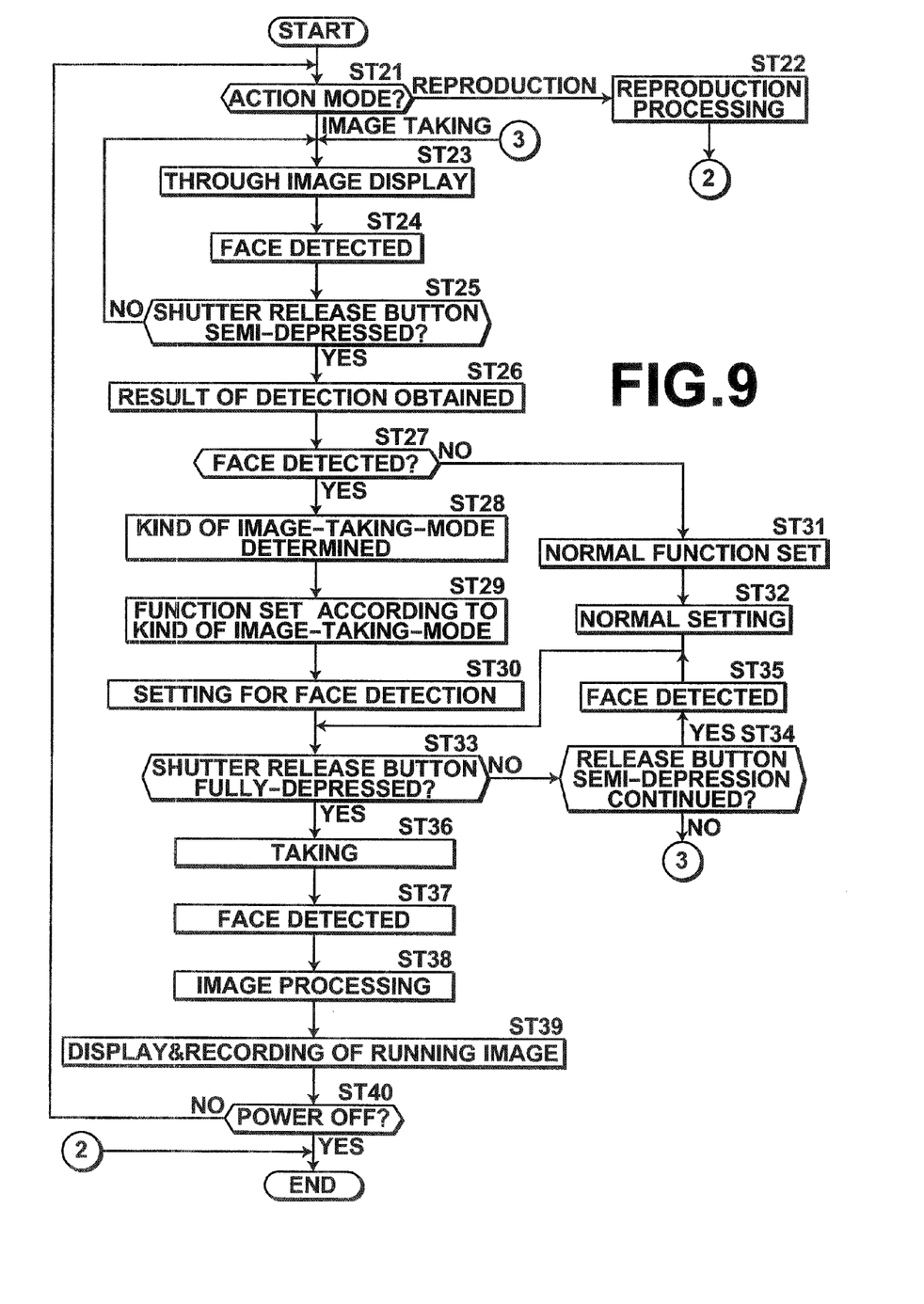
FIG. 9 is a view showing a flowchart for illustrating processing executed in another embodiment.

The face may be detected in the running image. This will be described, hereinbelow, as another embodiment of the present invention. FIG. 9 shows a flowchart for illustrating the processing to be carried out in another embodiment of the present invention.

The CPU 75 first determines the working mode of the digital camera 1. (step ST21) When it is determined that the working mode is the reproduction mode, the reproduction is carried out, where the image data which has been stored in the external recording medium 70 is read out and an image is displayed on the monitor 18 on the basis of the image data. (step ST22) Then the processing is ended.

On the other hand, when it is determined in step S1 that the working mode is the image-taking mode, the CPU 75 controls to take the through-image (step ST23). Then the face detecting portion 80 detects a face from the through image (step ST24) and whether the shutter release button 19 has been semi-depressed is determined. (step ST25) When step ST25 is denied, the CPU 75 returns to step ST23 and repeats the processing of step ST23 and the following step.

When step ST25 is affirmed, the CPU 75 takes a pre-taken-image to obtain the pre-image and obtains result of detection of a face by the face detecting portion 80 from the through image (step ST26). Then the CPU 75 determines whether the face has been detected on the basis of the result of detection. (step ST27) When step ST27 is affirmed, the CPU 75 determines the kind of the image-taking mode currently set (step ST28) and sets which of the AF processing function, AE processing function, AWB processing function, strobe light on/off function and the gradation processing function is to be used as the image taking condition and/or the image processing condition upon the running image taking according to the kind of the set image-taking mode. Then the CPU 75 instructs the AF portion 62, the AE/AWB portion 63, image processing portion 64 and the strobe control portion 73 on the fact. (function setting according to the image-taking mode; step ST29) And the AF portion 62, the AE/AWB portion 63, image processing portion 64 and the strobe control portion 73 set the AF processing, AE processing, AWB processing, on/off of the strobe light and/or the gradation processing. (setting for detecting a face step ST30).

When step ST7 is denied, the CPU 75 instructs the AF portion 62, the AE/AWB portion 63, image processing portion 64 and the strobe control portion 73 to execute the normal AF processing, AE processing, AWB processing, on/off of the strobe light and gradation processing according to the image-taking mode. (normal function setting; step ST31) Then, the AF portion 62, the AE/AWB portion 63, image processing portion 64 and the strobe control portion 73 set the AF processing, AE processing, AWB processing, on/off of the strobe light and gradation processing as instructed by the CPU 75. (normal setting; step ST32).

Following step ST30 or ST32, the CPU 75 determines whether the shutter release button 19 has been fully depressed. (step ST33) When the step ST33 is denied, whether depression of the shutter release button 19 is continued is determined. (step ST34) When step ST34 is affirmed, the face detecting portion 80 detects a face from the through image (step ST35) and the processing returns to step ST33. When step ST34 is denied, the processing returns to step ST23 and step ST23 and the following steps are repeated.

By carrying out the face detection in step ST35, the face detection can be continuously carried out on the through image before a running image is taken.

When step ST33 is affirmed, a running image is taken (running image-taking is carried out) (step ST36) and the face detecting portion 80 detects the face of a human from the running image taken by the running image-taking (step ST37). An image processing is carried out on the running image taken by the running image-taking so that the detected face has desired image quality. (step ST38) In this case, similarly to the case of the through image, the function of the image processing for the running image may be set by the use of the running image so that the image processing is carried out on the running image on the basis of the set functions.

Then the CPU 75 displays the processed running image on the liquid crystal monitor 18 and at the same time, records the same on the external recording medium 70. (step ST39) Then, the CPU 75 determines whether the power switch 22 is turned off (step ST40) and, when step ST40 is denied, the CPU 75 returns to step ST21 and repeats the processing in step ST21 and the following steps. When step ST40 is affirmed, processing is ended.

Figure 4:
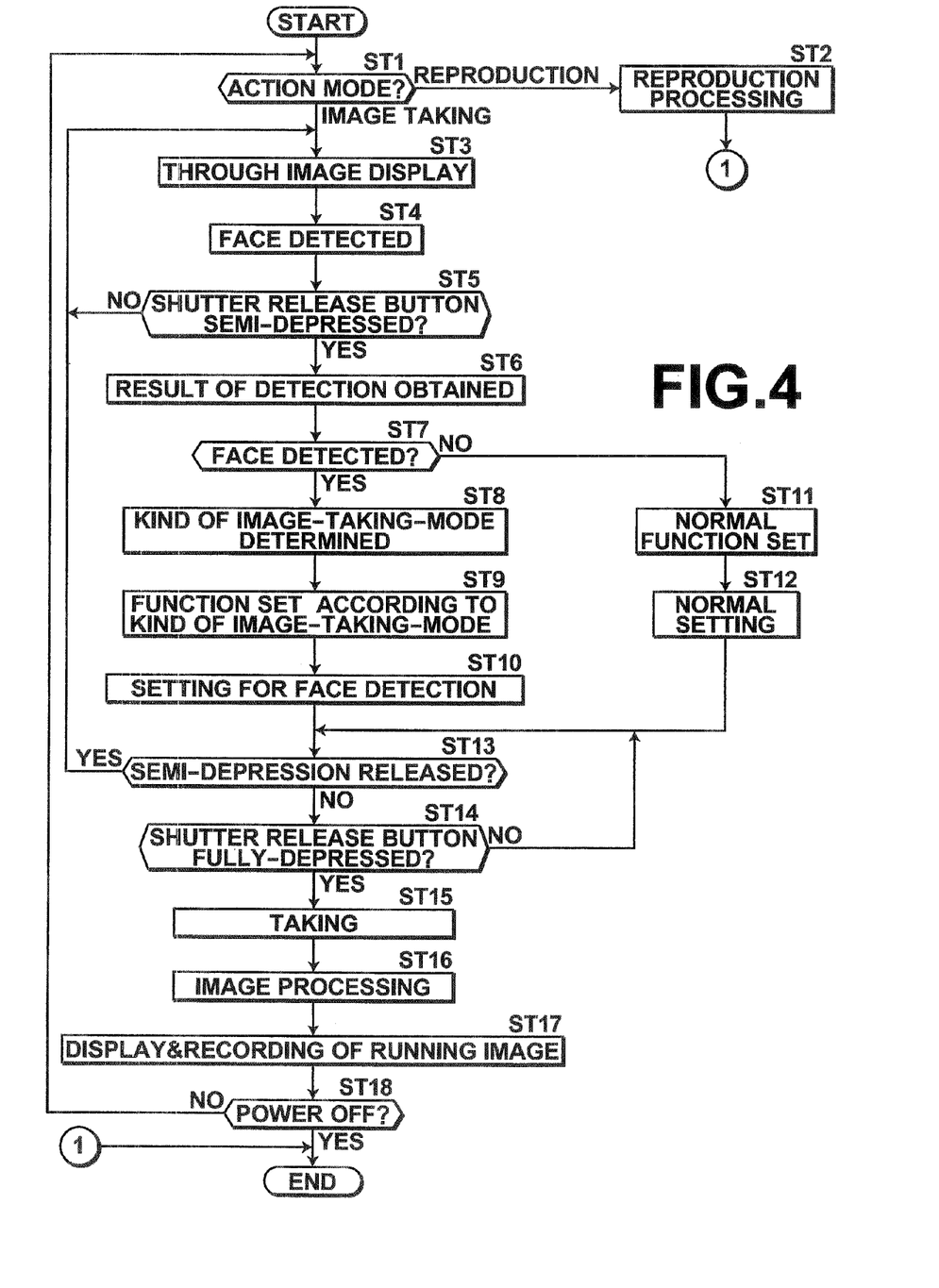
FIG. 4 is a view showing a flowchart for illustrating processing executed in the first embodiment.

Though, digital cameras in accordance with the embodiments of the present invention have been described, the program which causes a computer to function as a means corresponding to the AF portion 62, the AE/AWB portion 63, image processing portion 64, strobe control portion 73, face detecting portion 80 and the scene analysis portion 82 and to execute processing such as shown in FIG. 4 is also one of the embodiments of the present invention.

A computer readable recording medium on which such program is recorded is also one of the embodiments of the present invention.

What is claimed is:

1. An image taking system comprising
   an image taking means which takes an image,
   an objective body detecting means which detects at least a predetermined objective body from a pre-taken-image or a running image taken by the image taking means,
   a function setting means which, when the predetermined objective body is detected, sets an image obtaining function used in taking the pre-taken-image or the running image, according to the predetermined objective body out of image obtaining functions comprising at least one function for setting at least one of image taking conditions in taking the pre-taken-image or the running image, and/or at least one of image taking functions for setting at least one image processing condition to be carried out on the image obtained by taking the pre-taken-image or the running image, a processing control means which obtains the image by the use of the image taking condition and/or the image processing condition based on the set image obtaining function, and in which the function setting means is further provided with a means for carrying out scene analysis and obtaining a confidence of the scene analysis;

a means for setting the image obtaining function according to a photographing mode, and a means for setting the used image obtaining function according to the scene of the pre-taken-image or the running image, and the function setting means sets the used image obtaining function so that the priority is put on the means for setting the used image obtaining function according to the scene of the pre-taken-image or the running image rather than the means for setting the image obtaining function according to a photographing mode when the confidence in the scene analysis is high.

2. An image taking system as defined in claim 1 wherein the function setting means sets the used image obtaining function to interrupt the used image obtaining function according to the scene when the confidence in the scene analysis is low.

3. An image taking system as defined in claim 1, wherein information representing the functions used upon running image-taking is recorded to an external medium, attached to the running image together with information on image-taking mode when a face is detected.

4. The image taking system of claim 1, wherein the scene analysis is performed on a received image of the image taking means.

5. The image taking system of claim 4 wherein the scene analysis distinguishes between images including persons and images not including persons.

6. An image taking method comprising the steps of detecting a predetermined objective body from a pre-taken-image taken by an image taking means which takes an image, setting, when the predetermined objective body is detected, an image obtaining function used in taking the pre-taken-image or a running image according to the predetermined objective body out of image obtaining functions comprising at least one function for setting at least one of image taking conditions in taking the pre-taken-image or the running image, and/or at least one of image taking functions for setting at least one image processing condition to be carried out on the image obtained by taking the pre-taken-image or the running image, obtaining the image by the use of the image taking condition and/or the image processing condition based on the set image obtaining function, and wherein the setting further comprises carrying out a scene analysis and obtaining a confidence of the scene analysis, setting the image obtaining function according to a photographing mode, and setting the used image obtaining function according to the scene of the pre-taken-image or the running image, and setting the used image obtaining function so that the priority is put on the used image obtaining function according to the scene of the pre-taken-image or the running image rather than the means for setting the image obtaining function according to a photographing mode when confidence in the scene analysis is high.

7. An image taking system comprising an image taking means which takes an image, an objective body detecting means which detects a predetermined objective body from a running image taken by the image taking means, a function setting means which, when the predetermined objective body is detected, sets an image obtaining function used in taking the running image, according to the predetermined objective body out of image obtaining functions comprising at least one function for setting at least one of image processing conditions to be applied to the image obtained in taking the running image, and a processing control means which obtains the image by the use of the image processing condition based on the set image obtaining function, and in which the function setting means is further provided with means for carrying out scene analysis and obtaining a confidence of the scene analysis a means for setting the image obtaining function according to a photographing mode, and a means for setting the used image obtaining function according to the scene of the a pre-taken-image or the running image, and the function setting means sets the used image obtaining function so that the priority is put on the means for setting the used image obtaining function according to the scene of the pre-taken-image or the running image rather than the means for setting the image obtaining function according to a photographing mode when confidence in the scene analysis is high.

8. An image taking system as defined in claim 7 wherein the function setting means sets the used image obtaining function to interrupt the used image obtaining function according to the scene when the confidence in the scene analysis is low.

9. An image taking system as defined in claim 7, wherein information representing the functions used upon running image-taking is recorded to an external medium, attached to the running image together with information on image-taking mode when a face is detected.

10. An image taking method comprising the steps of detecting a predetermined objective body from a running image taken by an image taking means which takes an image, when the predetermined objective body is detected, setting an image obtaining function used in taking the running image, according to the predetermined objective body out of image obtaining functions comprising at least one function for setting at least one of image processing conditions to be applied to the image obtained in taking the running image, and obtaining the image by the use of the image processing condition based on the set image obtaining function, and wherein the setting further includes carrying out a scene analysis and obtaining a confidence of the scene analysis, setting the image obtaining function according to a photographing mode, and setting the used image obtaining function according to the scene of a pre-taken-image or the running image, and setting the used image obtaining function so that the priority is put on the used image obtaining function according to the scene of the pre-taken-image or the running image rather than the image obtaining function according to a photographing mode when a confidence in the a scene analysis is high.

* * * * *